Oct. 28, 1930.    D. H. SPICER    1,779,565
TIRE INFLATER
Filed April 4, 1929    4 Sheets-Sheet 2
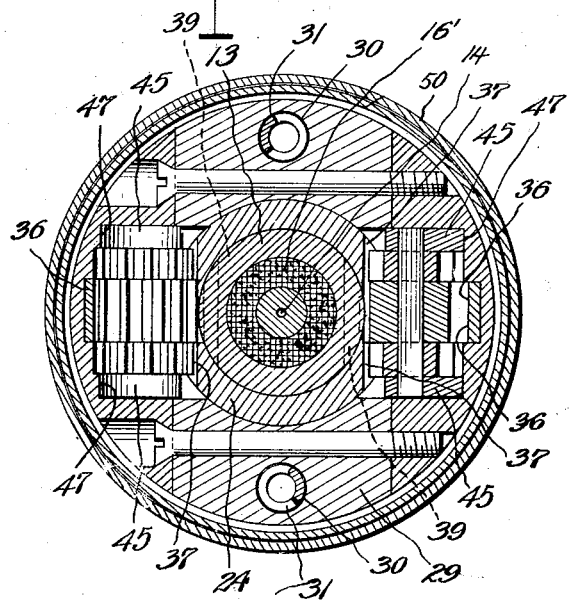
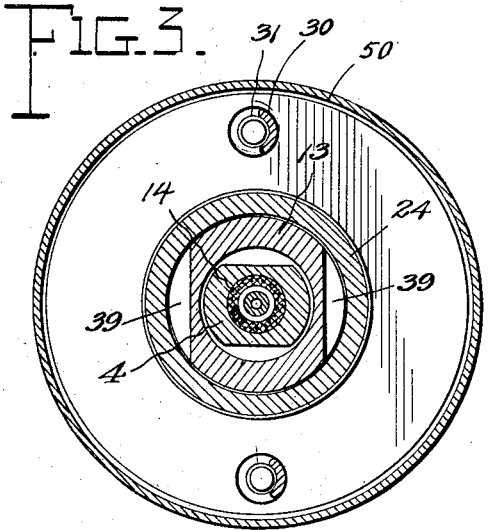
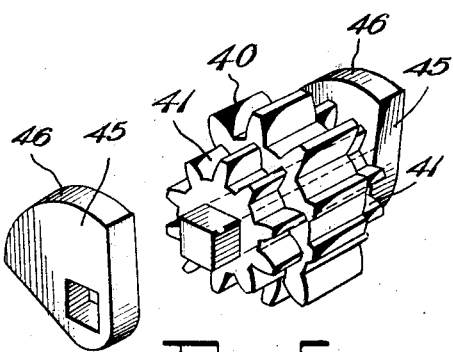
Inventor
Delphin H. Spicer
By Hull, Brock & West
Attorney Oct. 28, 1930.    D. H. SPICER    1,779,565
TIRE INFLATER
Filed April 4, 1929    4 Sheets-Sheet 3

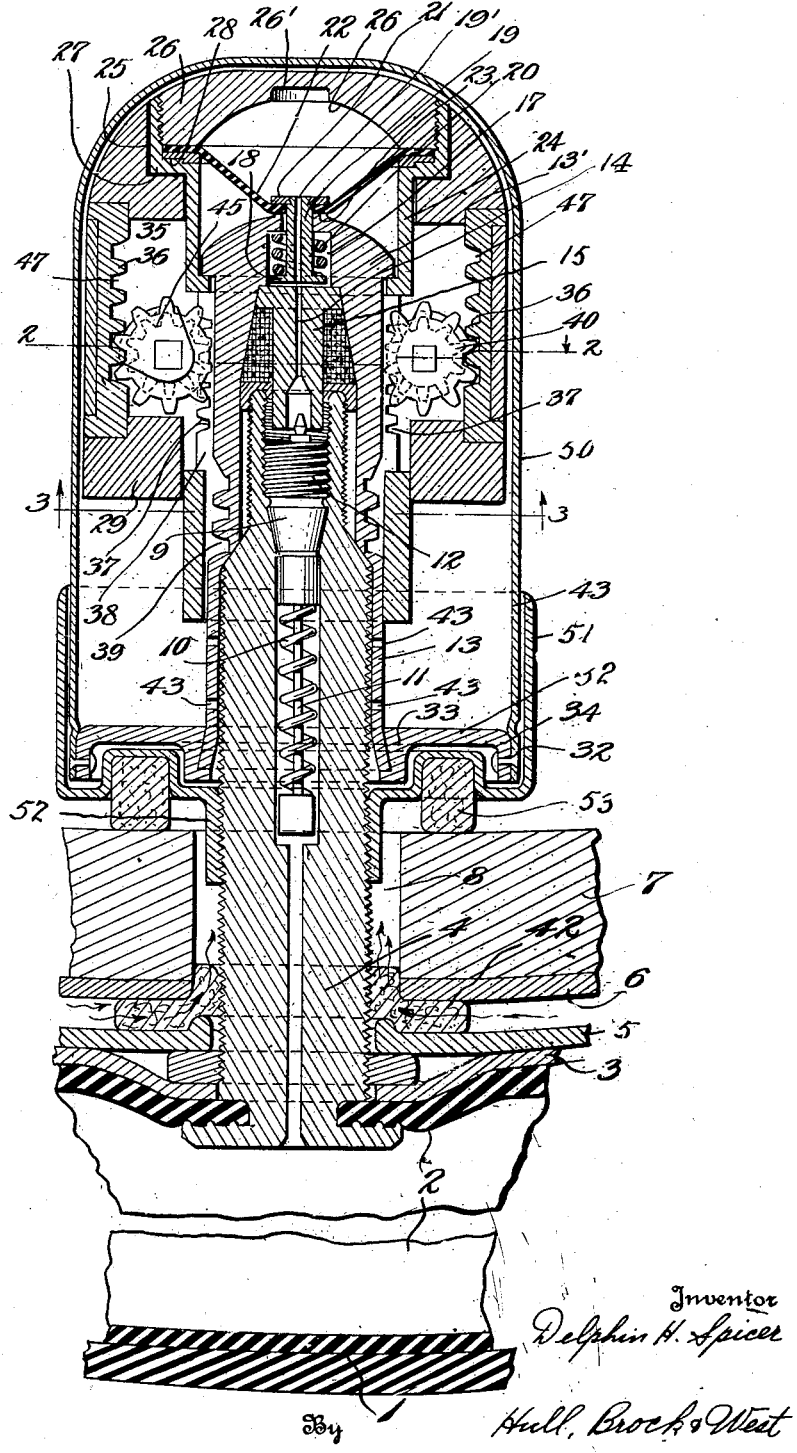

Inventor
Delphin H. Spicer
By Hull, Brock & West
Attorney

Oct. 28, 1930.  D. H. SPICER  1,779,565
TIRE INFLATER
Filed April 4, 1929    4 Sheets-Sheet 4

Inventor
Delphin H. Spicer
By Hull, Brock & West
Attorney

Patented Oct. 28, 1930

1,779,565

UNITED STATES PATENT OFFICE

DELPHIN H. SPICER, OF LAKEWOOD, OHIO

TIRE INFLATER

Original application filed June 27, 1927, Serial No. 201,927. Divided and this application filed April 4, 1929. Serial No. 352,402.

This invention relates to tire inflaters of the type disclosed in my co-pending United States application Serial No. 201,927 filed June 27, 1927, now Patent #1,708,637, of which this application is a division.

It is of course common knowledge that even in the best tires on standing or in use there is a slow but constant diminishing of the air contained therein, and it is necessary to reinflate the tire periodically if the pressure is to be maintained at the desired height.

The object of my invention is to provide a tire inflater which may be conveniently attached to the valve stems of the tires when in use to supply air to the tires in the amount required to maintain them at the required pressure.

A further object is to provide a pumping mechanism which is operated by the vibration and variation in speed of the wheel on which the tire is mounted.

With these and such other objects in view as will appear from the description, the invention resides in all the novel features of construction and combination of parts disclosed in the following description and drawings and particularly pointed out in the appended claims.

Figure 4:
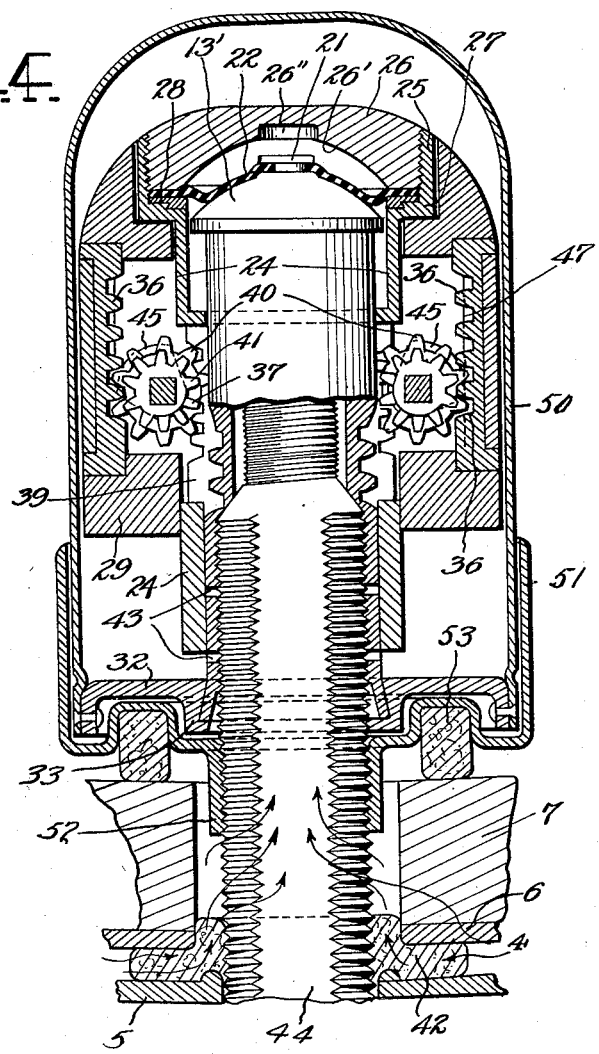
Figure 8:
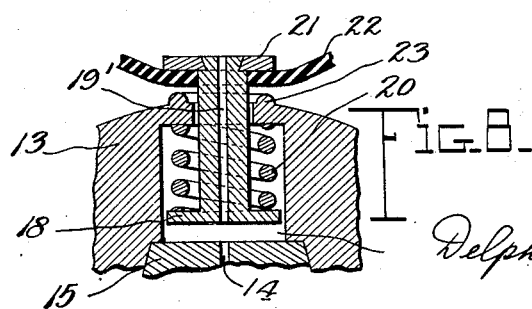
Figure 5:
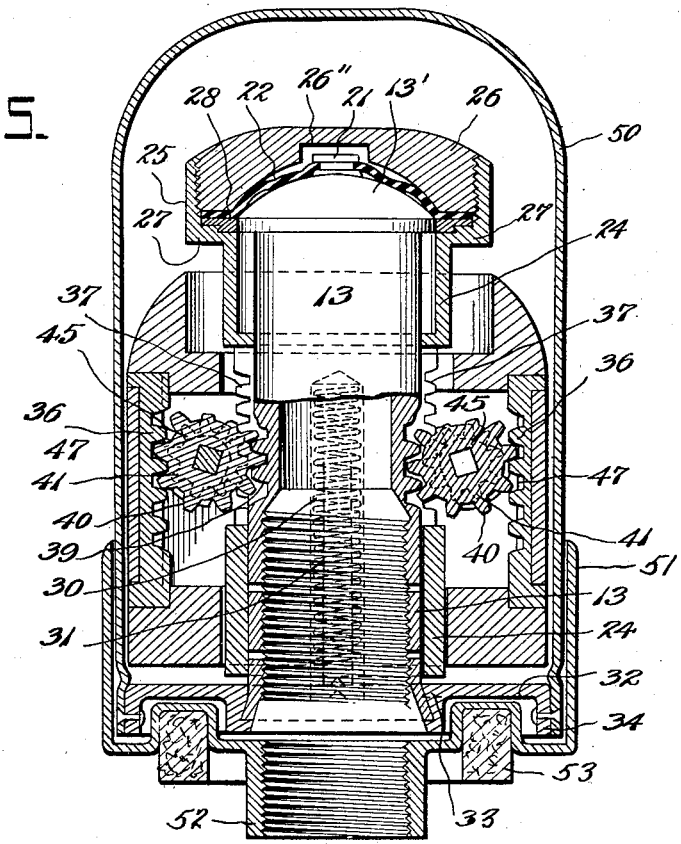
Figure 7:
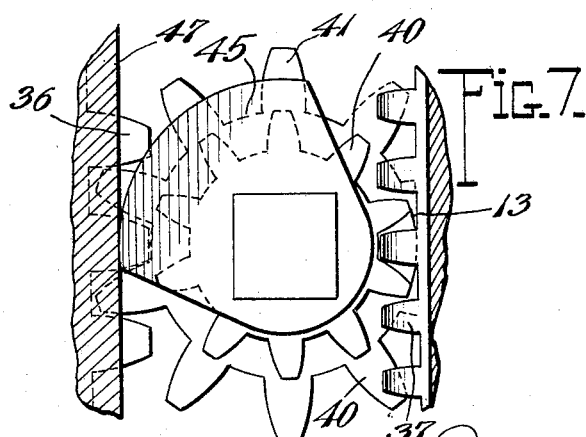

In the accompanying drawings Fig. 1 is a longitudinal sectional view through the apparatus embodying the features of the present invention, a fragment of the felly, rim and tire being seen, and the parts being shown on a magnified scale; Fig. 2 is a transverse section on the planes indicated by the line 2—2 of Fig. 1, looking in the direction indicated by the arrows; Fig. 3 is a similar section taken on the plane of line 3—3 of Fig. 1 and looking in the direction indicated by the arrow; Fig. 4 is a detail section showing the preliminary travel of the cylinder from the position shown in Fig. 1; Fig. 5 is a similar view showing the final movement of the weight and cylinder; Fig. 6 is a detail perspective of the actuating gears intermediate the weight and cylinder; Fig. 7 is a side elevation of the actuating gears showing the relation of the trunnion members; and Fig. 8 is a detail section of the diaphragm valve.

Referring to the figures by numerals, 1 indicates the ordinary or conventional pneumatic tire, or shoe, in which is arranged the usual inner tube 2 having the valve stem spreader 3, and valve stem 4. The tire is mounted on the usual demountable rim 5, which in turn is mounted on the fixed rim or felly band 6 carried by the felly 7. The fixed rim 6 and felly 7 are apertured at 8 for the passage of valve stem 4. The valve stem 4 also is provided with the well known conventional check valve 9 which, with its control spring 10, stem 11 and retaining nut 12, is commonly referred to as a valve "insides". The parts thus far mentioned are all well known and extensively in use. A sealing cap is commonly mounted on the extremity of the stem 4 to supplement resistance to the escape of air under pressure, and a dust-guard or cover cap is threaded over the whole stem structure in common use, but when the present invention is utilized, the dust-cap and sealing cap are omitted.

A tubular stationary piston 13 is threaded to and extends beyond the stem 4 and is provided with a packing gland 15 bored axially at 14 and arranged to communicate with the port of stem 4. The packing gland 15 is appropriately flanged and surrounded by a gasket or like packing 16 to seal the communication of the valve stem port with the piston 13. Beyond the gland 15, the piston 13 is provided with a reduced bore or axially extending recess 17 in which is arranged the flanged head 18 and a part of the body 19 of a check valve. The body 19 is cylindrical and surrounded by a coiled spring 20 tending to force the check valve radially outward. The inner end of the body 19 is surrounded by an annulus 21, preferably swaged or otherwise anchored to the body 19 of the check valve to provide an inner head. Since the tire 1 is outward of the wheel construction and the other parts extend inward toward the axis of rotation, parts will be referred to as inward or outward, according to their relative radial location with respect to the wheel on which they are mounted. A flexible elastic diaphragm 22, preferably india rubber, snugly surrounds the body 19 of the check valve in contact with the outer face of the head 21 in position for being stressed by the spring 20 so as to hold the portion of the diaphragm surrounding the stem or body 19 against an annular seat 23 in the form of a ridge extending inward from the inner extremity of the piston 13 about the bore of said piston through which the body 19 of the check valve extends.

A cylinder 24 slidably surrounds the piston 13 and is adapted to reciprocate relative thereto to provide a guide therefor, the cylinder 24 snugly enclosing the cylindrical part of the piston 13 and extending beyond the same. The cylinder 24 is of uniform diameter, equal substantially to the diameter of the cylindrical portion of the piston 13 for the greater part of its length, and terminates at its inner extremity in an annular off-set or enlarged portion 25 into which is seated by threading or other appropriate anchorage means, a nut or cap 26 forming a cylinder head. The enlarged portion 25 produces the outstanding annular shoulder 27 which is lined by a packing gasket 28, and between the gasket 28 and the inner face of nut 26 extends the margins of the diaphragm 22, so as to be clamped in place when the head 26 is seated in operative position. The inner terminus of piston 13 is preferably convex as seen at 13′. The face of the head 26 on the side toward the piston 13 is provided with a concavity 26′ corresponding in dimensions and contour approximately to those of the convexity 13′ so that when the inner terminus of one member engages the outer terminus of the other they approximately fit, the diaphragm 22 being, of course, interposed between and conforming to the contour of the parts engaged incident to its flexibility. A pocket 26″ is formed in the head 26 opening into the concavity 26′ to accommodate the flange 21 and corresponding part of the body of the check valve 19 when the piston and cylinder head are in position of perfect contact, or as nearly perfect as is attainable. Thus, a cavity or chamber is provided between the inner face of the diaphragm 22 and the surface of the head 26 whenever the piston and cylinder are moved relatively apart and whenever the cylinder and piston are brought together, air within said cavity or chamber is compressed and when sufficiently compressed is forced along the port 19′ formed in the check valve 19, along the port 14 and outward past the valve 9 and into the inner tube 2. Since air is admitted between the diaphragm 22 and the check valve seat 23 into space about the check valve 19 and thence through port 19′ into said space or chamber when check valve 19 is released from a firm seating upon bead 23, it will be seen that by relative reciprocation of piston 13 and cylinder 24, successive charges of compressed air may be injected into the inner tube 2 until such relative movement is stopped.

It will also be apparent that when the pressure within the tire reaches the point of equilibrium relative to attainable pressure in the chamber between diaphragm 22 and head 26, further injection of air will not occur.

It will further be noted that when the diaphragm is expanded as in Fig. 5, there is a trapped body of air between it and the cylinder head and in the opposite movement of the diaphragm this air is expanded, with a consequent reduction of its pressure which is restored to atmospheric pressure by the admission of air through the diaphragm valve. When the pressure of the expanded air between the diaphragm and head equals that of the atmosphere further feed to the tire is prevented even though the pump continues operation.

As a means to effect requisite relative reciprocation of the parts as above indicated, a sliding weight 29 surrounds the cylinder 24 and is free to reciprocate relative thereto, its movements being radial with respect to the axis of rotation of the wheel structure of which valve stem 4 is a part. The weight 29 is provided with two recesses 30 at diametrically opposite points in which fit the coiled springs 31 which extend from the weight 29 outward and might be permitted to engage the felly 7, but for effectiveness and completeness of organized structure, a retaining plate is preferably provided for being engaged by the springs 31 which retaining plate consists of an annulus 32 having radially extending inner and outer flanges 33 and 34. The flange 33 may be shrunk on the outer extremity of the skirt of piston 13 or otherwise anchored thereto as by a driven fit. The weight 29 is provided with a pair of diametrically oppositely arranged longitudinal slots 35, each being formed with a rack 36 facing toward the cylinder 24. The cylinder 24 is provided with a pair of racks 37 for each rack 36, each rack 37 facing in the opposite direction or toward the respective recess 35, the teeth of each rack 37 being of reduced dimensions relative to the teeth 36. The cylinder 24 is provided with a longitudinal slot 38 between each pair of racks 37 for permitting the passage of the teeth of the spur gear, hereinafter mentioned. Piston 13, approximately midway of the length of its skirt is provided with a toothed rack 39 corresponding in dimension of teeth to the dimensions of the teeth of racks 36, there being one rack 39 for each rack 36 located outward of the racks 37.

Arranged within each recess 35 is a preferably integral differential gear including a main mutilated pinion 40 disposed to have its teeth meshing with the rack 36 and its flat or mutilated face slidingly engaging the adjacent smooth surface of piston 13. At each side of each pinion 40 and preferably formed integral therewith and completing the differential gear are pinions 41 of reduced diameter relative to pinion 40, dimensioned to engage the teeth of the respective racks 37, 37.

In operation, the parts being mounted as described, shocks and jars will effect reciprocation of the cylinder 24 relative to piston 13 or shocks and jars plus centrifugal force will accomplish such action, or variations in centrifugal force incident to changes in the speed of rotation of the tire 1 will accomplish such action. Thus, if the springs 31 are tensioned to resist radial outward movement of weight 29 under the centrifugal force incident to that speed of rotation attained say when the vehicle to which the wheel is applied has acquired a speed of fifteen miles an hour, the weight 29 will remain substantially stationary, except for movements incident to shocks and jars, until the speed of vehicle passes the speed limit mentioned. The weight 29 will then begin to travel outwardly under centrifugal force, the speed and extent of travel being exactly proportional to the rate of acceleration and speed of rotation attained by the wheel to which tire 1 is applied. If the requisite speed is attained, the weight 29 will make a full stroke. In making this stroke, the first part of the movement occurs while the pinion or spur 40 is in mesh with the rack 36 and the pinions 41 are in mesh with the racks 37. Hence, during the first part of the outward stroke of weight 29, cylinder 24 moves outward with the weight so that the movement of the diaphragm 22, under the lower resistances of less compressed air, will occur readily and quickly but when the gears 40 reach the place of the first notch of the racks 39, the outermost tooth contacting with piston 13 will enter such recess and the said gear will walk along the respective racks 39. This walking movement causes such angular advance or partial rotation of the gears 41 as to compensate in part for the outward travel of the differential gears, so that the cylinder 24 can not move outwardly at the same rate as the weight 29 but only at a rate incident to the ratio of the gears. The leverage afforded the weight 29 in distributing its stress to the cylinder 24 may thus be rendered amply high to insure a stroke of the piston against any required compression of the air in the chamber bounded by the diaphragm 22 and the outer face of nut 26.

Under the spring tension proposed the weight is supported at substantially normal position and no pumping occurs until the speed reaches approximately fifteen miles per hour, except the movement of the weight due to vibration or road jars causing a shifting action thereof. When the speed is increased above fifteen miles per hour the weight initiates a radial centrifugal movement and owing to the relation of its master gear with the wall of the piston slides thereon and carries the cylinder at a speed uniform with the weight travel. During this sliding movement of the weight upon the fixed piston the teeth of its master gear reaches the rack portion upon the piston and by engagement therewith causes a revolution of the gear which through the differential gearing transmits a retarded movement to the cylinder which, due to the increased leverage, imparts additional power for the final compressive action.

It has been found impracticable to provide the piston and cylinder with the usual packing rings, as under slow pumping action the escape of air past such rings prevents a maintenance of the desired pressure. To avoid such leakage I use the sealed diaphragm which provides an expansible compression chamber at the cylinder head to retain the deisred pressure without leakage. This pressure at the seat 23 forms a secondary seal for the usual valve in the stem.

To prevent the gears 40 from meshing too tightly with the teeth of the rack 36, trunnions 45 are provided. These trunnions, of the shape shown in Fig. 5, are located on each side of the gears 41. One surface of the trunnions is a section of a cylinder, as at 46, and is adapted to roll on the plane surfaces 47 in the recesses 35. This trunnion structure reduces the friction used in operating the gears to a very large extent affording a highly efficient operation thereof.

In operation, air is admitted preferably through a filter 42 constructed in the form of an annulus disposed between the fixed rim 6 and the demountable rim 7, and surrounds the valve 4 and proportioned to transversely fill the opening 8. Air is drawn in between the fixed and demountable rims and is thus kept free from dust and other foreign articles and passes up along the flattened sides 44 of the valve stem 4 between the stem and outer portion of the skirt of piston 13. Lateral ports 43 are provided through said skirt of piston 13 to allow the air to enter the space between weight 29 and the sleeve of the cylinder from which it moves inward through the slots 38 and along the cylindrical walls of the piston 13 to a point between the concave terminus of piston 13 and the outer face of diaphragm 22. Air is drawn to this position incident to the return movement of the cylinder 24 and the weight 29, and due to the fact that air is by such movement also drawn past the check valve seat 23 and into the compression chamber as previously described. To prevent access of foreign matter to the mechanism and otherwise protect it, a housing or shell 50 encloses the same, and is fixed to the annular flange 34 as by a driven fit or rivets or otherwise. Replacing the ordinary clamping nut used with the valve stem is a cup member 51 into which the lower end of the shell 50 fits, the cup being provided with a threaded neck portion 52 which engages the threads on the valve stem 4. The outer face of the bottom of the cup member 51 is provided with an annular recess in which is received a cushion gasket 53 which engages the felly 7 when the cup is tightened on the valve stem 4 to hold the stem securely in the opening 8 in the felly. The housing 50 with the annulus 32 and the mechanism as a unit may be removed from the valve stem without removing the cup member 51, the cup member operating merely as a clamping nut for the valve stem and a housing for the outer end of the tire inflater.

The ratio of the gearing illustrated in the drawing is such that after the gears 40 begin to walk in the racks 39, the advance or compressing movement of the cylinder 24 is substantially one-sixth that of the movement of the weight 29, but of course, the gear ratios may be varied to any extent found desirable in any particular instance, and the leverage increased or decreased as found preferable. Also other changes may be made in the proportions, construction and operation of parts without departing from the spirit and scope of the invention and well within the protective force and intent of the appended claims.

Having thus described my invention, what I claim is:

1. A tire inflater adapted to be connected to the valve stem of a pneumatic tire and to revolve therewith when the tire is in use on a wheel including a cylinder member, a piston member in said cylinder and reciprocable relative thereto, means for reciprocating one of said members relative to the other including a weight adapted to be moved in one direction by centrifugal force, a rack secured to said weight, a second rack secured to one of said members, a set of differential gears engaging said racks whereby the motion of said weight is transmitted to said member with an increase in force.

2. A tire inflater adapted to be connected to the valve stem of a pneumatic tire and to revolve therewith when the tire is in use on a wheel including a cylinder member, a piston member in said cylinder and reciprocable relative thereto, means for reciprocating one of said members relative to the other including a weight adapted to be moved in one direction by centrifugal force, a rack secured to said weight, a second rack secured in fixed relation to one of said members in opposed relation to the first rack, a third rack secured to the other of said members, a set of differential gears non-rotatably secured to each other, one of said gears engaging the first and second racks, and a second gear of less diameter engaging the third rack whereby as the larger gear moves between the first and second racks, the second gear moves along the third at a different speed and the motion of the weight is transmitted to the second member with an increase in force.

3. A tire inflater adapted to be connected to the valve stem of a pneumatic tire and to revolve therewith when the tire is in use on a wheel including a cylinder member, a piston member in said cylinder and reciprocable relative thereto, means for reciprocating one of said members relative to the other including a weight adapted to be moved in one direction by centrifugal force, a rack on said weight, a second rack secured in fixed relation to one of said members in opposed relation to said first rack when the weight moves past a predetermined point, a mutilated gear operating in said racks, a bearing extending from one of said racks on which the mutilated teeth on said gear may slide when the gear passes the end of said rack, and means on said gear operatively engaging the second member to cause it to move relative the first member at any point along the path of motion imparted to said gear by said weight, the rate of relative motion between said members being decreased when said gear rotates between said racks with a proportional increase in the force with which said member is moved.

4. A tire inflater adapted to be connected to the valve stem of a pneumatic tire and to revolve therewith when the tire is in use on a wheel including a cylinder member, a piston member in said cylinder and reciprocable relative thereto, means for reciprocating one of said members relative to the other including a weight adapted to be moved in one direction by centrifugal force, a rack on said weight, a second rack secured in fixed relation relative to one of said members in opposed relation to said first rack when the weight moves past a predetermined point, a mutilated gear operating in said racks, a bearing extending from one of said racks on which the mutilated teeth on said gear may slide when the gear passes the end of said rack, a third rack on the second member, a gear non-rotatably secured to the first gear and of lesser diameter engaging the third rack, whereby the second member is moved relative the first member as the first gear travels along the bearing portion or rotates between the first and second racks, the rate of relative motion between said members being decreased when said gear rotates between said racks with a proportional increase in the force with which said member is moved.

5. A tire inflater adapted to be connected to the valve stem of a pneumatic tire and to revolve therewith when the tire is in use on a wheel including a cylinder member, a piston member in said cylinder and reciprocable relative thereto, means for reciprocating one of said members relative to the other including a weight adapted to be moved in one direction by centrifugal force, a rack on said weight, a second rack secured in fixed relation relative to one of said members in opposed relation to said first rack when the weight moves past a predetermined point, a mutilated gear operating in said racks, a bearing extending from one of said racks on which the mutilated teeth on said gear may slide when the gear passes the end of said rack, a third rack on the second member, a gear non-rotatably secured to the first gear and of lesser diameter engaging the third rack, whereby the second member is moved relative the first member as the first gear travels along the bearing portion or rotates between the first and second racks, the rate of relative motion between said members being decreased when said gear rotates between said racks with a proportional increase in the force with which said member is moved, and trunnions on said gears for engaging the weight member to prevent the gear from meshing too tightly with the rack carried thereby.

6. In an inflating device, means for attaching said device to a vehicle wheel having a tube and valve stem as a unit to be normally carried thereby, a pump forming a part of said unit and normally connected with said valve stem to deliver thereinto, an inertia operated weight also forming a part of said unit, and means connecting said weight and one portion of said pump in such a manner that said pump portion moves at the same speed as said weight through the first part of its pumping stroke and at a slower speed than said weight through a succeeding portion thereof.

7. In an inflating device, means for attaching said device to a vehicle wheel having a tube and valve stem as a unit to be normally carried thereby, a pump forming a part of said unit and normally connected with said valve stem to deliver thereinto, an inertia operated weight also forming a part of said unit, and means connecting said weight and one portion of said pump in such a manner that said pump portion decreases in speed with respect to said weight during the pumping stroke thereof.

8. In an inflating device, means for attaching said device to a vehicle wheel having a tube and valve stem as a unit to be normally carried thereby, a pump forming a part of said unit and normally connected with said valve stem to deliver thereinto, an inertia operated weight also forming a part of said unit, and means connecting said weight and one portion of said pump in such a manner that said pump portion moves at a slower speed than said weight during a portion of the pumping stroke thereof.

In testimony whereof, I hereunto affix my signature.

DELPHIN H. SPICER.